(12) United States Patent
Bekraoui et al.

(10) Patent No.: US 8,451,182 B2
(45) Date of Patent: May 28, 2013

(54) VEHICLE PANE WITH AT LEAST ONE HEATING CONDUCTOR AND AT LEAST ONE ANTENNA

(75) Inventors: Leila Bekraoui, Munich (DE); Michael Weber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 405 days.

(21) Appl. No.: 12/822,342

(22) Filed: Jun. 24, 2010

(65) Prior Publication Data

US 2010/0328168 A1 Dec. 30, 2010

(30) Foreign Application Priority Data

Jun. 25, 2009 (DE) .................... 10 2009 030 344

(51) Int. Cl.
*H01Q 1/32* (2006.01)

(52) U.S. Cl.
USPC .......................................... 343/704; 343/713

(58) Field of Classification Search
USPC ......................................... 343/704, 712, 713
See application file for complete search history.

(56) References Cited

U.S. PATENT DOCUMENTS

| | | | | |
|---|---|---|---|---|
| 5,231,410 A * | 7/1993 | Murakami et al. | | 343/713 |
| 5,428,830 A * | 6/1995 | Zerod et al. | | 455/282 |
| 5,650,791 A * | 7/1997 | Talty | | 343/713 |
| 6,239,758 B1 * | 5/2001 | Fuchs et al. | | 343/713 |
| 6,307,515 B1 | 10/2001 | Sauer et al. | | |
| 6,534,720 B2 | 3/2003 | Von Alpen et al. | | |
| 2003/0058178 A1 * | 3/2003 | Von Alpen et al. | | 343/713 |
| 2004/0113854 A1 | 6/2004 | Lindenmeier | | |
| 2007/0273597 A1 * | 11/2007 | Noda | | 343/713 |
| 2008/0106480 A1 * | 5/2008 | Nagayama et al. | | 343/713 |
| 2009/0015492 A1 | 1/2009 | Kuehne | | |
| 2009/0262032 A1 * | 10/2009 | Chung | | 343/713 |
| 2011/0115681 A1 * | 5/2011 | Oshima et al. | | 343/713 |

FOREIGN PATENT DOCUMENTS

| | | |
|---|---|---|
| DE | 24 29 628 A1 | 1/1976 |
| DE | 42 37 818 A1 | 5/1994 |
| DE | 198 56 663 A1 | 6/2000 |
| DE | 100 02 777 C1 | 8/2001 |
| DE | 102 45 813 A1 | 4/2004 |
| DE | 10 2007 028 755 A1 | 12/2008 |
| DE | 20 2009 000 782 U1 | 7/2009 |
| WO | WO 2007/023054 A1 | 3/2007 |

OTHER PUBLICATIONS

German Search Report dated Nov. 3, 2009 with English translation (nine (9) pages).

* cited by examiner

*Primary Examiner* — Don Le
(74) *Attorney, Agent, or Firm* — Crowell & Moring LLP

(57) ABSTRACT

A vehicle pane exhibits a heating conductor field with at least one heating conductor and at least one antenna, wherein the at least one antenna is mounted on an area of the vehicle pane that is free with respect to the heating conductor field and wherein the heating conductor field has the basic shape of an essentially angular sector. The vehicle pane can also have bus bars for supplying power to at least one heating conductor, the bus bars being arranged on a common edge of the vehicle pane.

21 Claims, 3 Drawing Sheets

VEHICLE PANE WITH AT LEAST ONE HEATING CONDUCTOR AND AT LEAST ONE ANTENNA

CROSS-REFERENCE TO RELATED APPLICATION

This application claims priority under 35 U.S.C. §119 from German Patent Application No. DE 10 2009 030 344.8, filed Jun. 25, 2009, the entire disclosure of which is herein expressly incorporated by reference.

BACKGROUND AND SUMMARY OF THE INVENTION

The invention relates to a vehicle pane with at least one heating conductor and at least one antenna.

WO 2007/023054 relates to an antenna system, in particular for a vehicle pane with a heating conductor field, in particular on or in a vehicle pane, and with an antenna conductor structure, which is coupled to the heating conductor field using high frequency technology. Furthermore, this prior art describes a multi-range antenna system that is intended, in particular, for a vehicle pane and exhibits the following features: a heating conductor field having lateral recesses, in particular, on or in a vehicle pane, an antenna conductor structure for at least two reception ranges outside the heating conductor field, which is arranged essentially in the lateral recesses of the heating conductor field, and a low resistance, but non-electric coupling of the antenna conductor structure to the heating conductor field using high frequency technology.

This known antenna conductor structure is effective for one of the at least two reception ranges. The heating conductor field is configured so as to form two parts with a large heating conductor field area, which covers the pane from the left edge of the vehicle pane as far as to the right edge of the vehicle pane and from a bottom edge upwards to almost an apex of a wiping field, which is covered when the windshield wiper is operating. An upper peak area of the wiping field has a small heating conductor area, which does not extend laterally as far as the edge of the vehicle pane and extends upwards just barely beyond the wiping field. Both heating conductor field areas have a rectangular basic shape, on which the heating conductors run horizontally in a straight line. Both heating conductor areas are supplied by common bus bars, where the bus bars are mounted on a left edge and/or on a right edge of the respective heating conductor area in corresponding bus bar sections.

A drawback with the above design is that the bus bar sections that relate to the various heating conductor field areas, as well as the feed lines to the bus bars, have to be designed so as to vary in width and/or thickness in order to be able to send an approximately identical current through all of the heating conductors. However, the different conductor thicknesses are visually easy to detect, a feature that produces a non-uniform and low quality appearance. Furthermore, the right and the left bus bar remain on the opposite pane sides, as a result of which the open spaces or the free areas that are used for mounting the antenna structure are comparatively small.

The object of the invention is to avoid the afore-mentioned drawbacks and to provide, in particular, a vehicle pane, which makes possible an improved antenna function.

This object is achieved according to the invention by a vehicle pane that exhibits a heating conductor field with at least one heating conductor and at least one antenna, wherein the at least one antenna is mounted on an area of the vehicle pane that is free with respect to the heating conductor field and wherein the heating conductor field has the basic shape of an essentially angular sector.

Since the heating conductor field has the basic shape of an essentially angular sector, it is possible, in contrast to, for example, a rectangular heating conductor field, for the side of the free area of open space to be significantly enlarged, a feature that in turn allows greater design flexibility for antennas that are mounted on the open space. The open space is typically not heated. The heating conductor field can be defined, for example, in essence by an outer contour of at least one heating conductor structure. The basic shape of an angular sector can include the basic shape of a circular sector or the basic shape of an annular sector.

The significantly enlarged open space makes possible the further development that the vehicle pane has two or more antennas, each of which is mounted on a different area of the free area of the vehicle pane. In this way it is possible to adapt to the different boundary conditions (frequency ranges, etc.) with a different lay-out of the antennas, a feature that in turn makes it possible to improve the reception. The two antennas can differ not only in their construction but also in their function. As an alternative, one antenna can be mounted on a plurality of open spaces or open space areas in order to achieve a better performance.

In particular, it is a further development that one of the antennas mounted on (that is, on or in) the free area is used for an AM reception (AM antenna), whereas the other antenna is configured for other functions, like FM reception, DAB, radio remote control services and/or TV. As an alternative, an AM antenna, etc. may be mounted on and/or distributed over a plurality of open spaces or open space areas in order to achieve an enhanced performance.

An additional further development and also autonomous solution to the technical problem is that the vehicle pane, which exhibits a heating conductor field with at least one heating conductor and at least one antenna, the at least one antenna being mounted on an area of the vehicle pane that is free with respect to the heating conductor field, has bus bars for supplying power to at least one heating conductor. The bus bars are arranged on a common or identical edge and/or side area of the vehicle pane and/or are concentrated on one side of the pane. This positioning of the bus bars allows for an especially compact heating conductor field and, thus, especially large open spaces, because the heating conductor field does not have to be run over the vehicle pane between two bus bars that are arranged on opposite edges.

Especially for vehicles, which have a hatchback that is provided with the vehicle pane, it is a further development that the bus bars are arranged on either the bottom edge or on the upper edge, as a function of whether the windshield wiper is positioned on the bottom edge and/or the side area or on the upper edge and/or the side area of the vehicle pane. This configuration offers the advantage of greater robustness in the electromagnetic coupling, because in the past, for example, as shown in WO 2007/023054, the cable harnesses in hatchback vehicles ran right and left parallel to the right and left side panes. In these locations were also the bus bars, as a result of which it is possible to achieve a very good, but undesired coupling between the respective cable harness and the rear pane antenna, a feature that can easily result in interference. In contrast, the present configuration can reduce the coupling, because the at least one antenna that is mounted on the open space can be designed such that it has only a few connections that run parallel to the right and/or left edge of the pane.

It is also a further development that at least one section of the at least one heating conductor is designed as an arc shaped heating conductor section that runs between the bus bars. The at least one arc shaped heating conductor section can be designed so as to be curved or arced. Then, the resulting heating conductor field can have the shape of either an annular sector or a circular sector. The roundness of the antenna permits a far better vertical polarization than is the case with the conventional pane antennas.

As an alternative, the at least one arc shaped heating conductor section can be designed in such a way that it has a plurality of straight subsections, where the adjacent subsections are angled in relation to each other. Such a polyline-like arc shaped heating conductor section can have, for example, three straight subsections that form a U shape so that the legs are sloped outwards. Then the resulting heating conductor field can exhibit the shape of a symmetrical trapezoid.

In a further development, the bus bars are arranged in a black print area. As a result, the bus bar can be hidden from the sight of a viewer, a feature that produces a visually high quality appearance.

Yet another further development consists of configuring or providing at least one antenna in order to operate at least in the AM range. In principle, one or more antennas or antenna structures can be configured to operate at least in the AM range and/or can be operated at least in the AM range. The at least one antenna can be configured and/or provided exclusively for AM operation or for a mixed operation in the AM range and in at least one other range, for example, for FM or DAB reception, etc.

According to an additional further development, at least two (totally curved or polyline-like) arc shaped heating conductor sections are electrically connected together in series. This measure allows a length adaptation of the heating conductor between the bus bars to be achieved, a feature that makes possible a width adaptation of the heating conductor. The width adaptation of the heating conductor in turn results in a heating conductor field that is inconspicuous from a design viewpoint.

A subsequent further development lies in the fact that the vehicle pane has a group of several, for example, at least four, preferably adjacent, arc shaped heating conductor sections so that pairs of the arc shaped heating conductor sections are electrically connected together in series alternatingly from the outside inwards. As a result, it is possible to achieve an especially good length adaptation in a simple way.

One configuration is that a common length of the arc shaped heating conductor sections that are connected together in series lies inside a predefined area. For this purpose three or more arc shaped heating conductor sections can also be connected together in series.

In a subsequent design the vehicle pane has arc shaped heating conductor sections that are connected together in series and arc shaped heating conductor sections that are not connected together in series. Hence, a common length of both the arc shaped heating conductor sections that are connected together in series and the arc shaped heating conductor sections that are not connected together in series lies inside a predefined area.

In another embodiment, the at least one heating conductor is configured at least partially as an antenna. In this case the heating conductor antenna is used preferably for a reception of FM, DAB, TV, etc. For this purpose the heating conductor antenna is suitably wired using electrical technology, for example, with inductances in the heating conductor field terminals.

In an additional design, the vehicle pane has a plurality of antenna terminals, where all of the antenna terminals are concentrated in a narrow area. Then, the antenna terminals can be housed in a common compact housing, optionally together with the associated antenna amplifiers or parts thereof. As an alternative or in addition, the antenna amplifiers or parts thereof can also be arranged at a distance from the rear pane, for example, on a structure of the vehicle body.

Furthermore, it is a further development that the antenna terminals and/or the housing are arranged in a black print area. As a result, these components can be hidden from the viewer's sight, a feature that produces a visually high quality appearance.

The amplifier housing may also be mounted centrally on an upper edge of the vehicle pane, a feature that enables an especially compact design with negligible wiring complexity. The at least one antenna that is mounted in an open space may be a log periodic antenna. As a result, the wideband capability of the antenna is increased.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
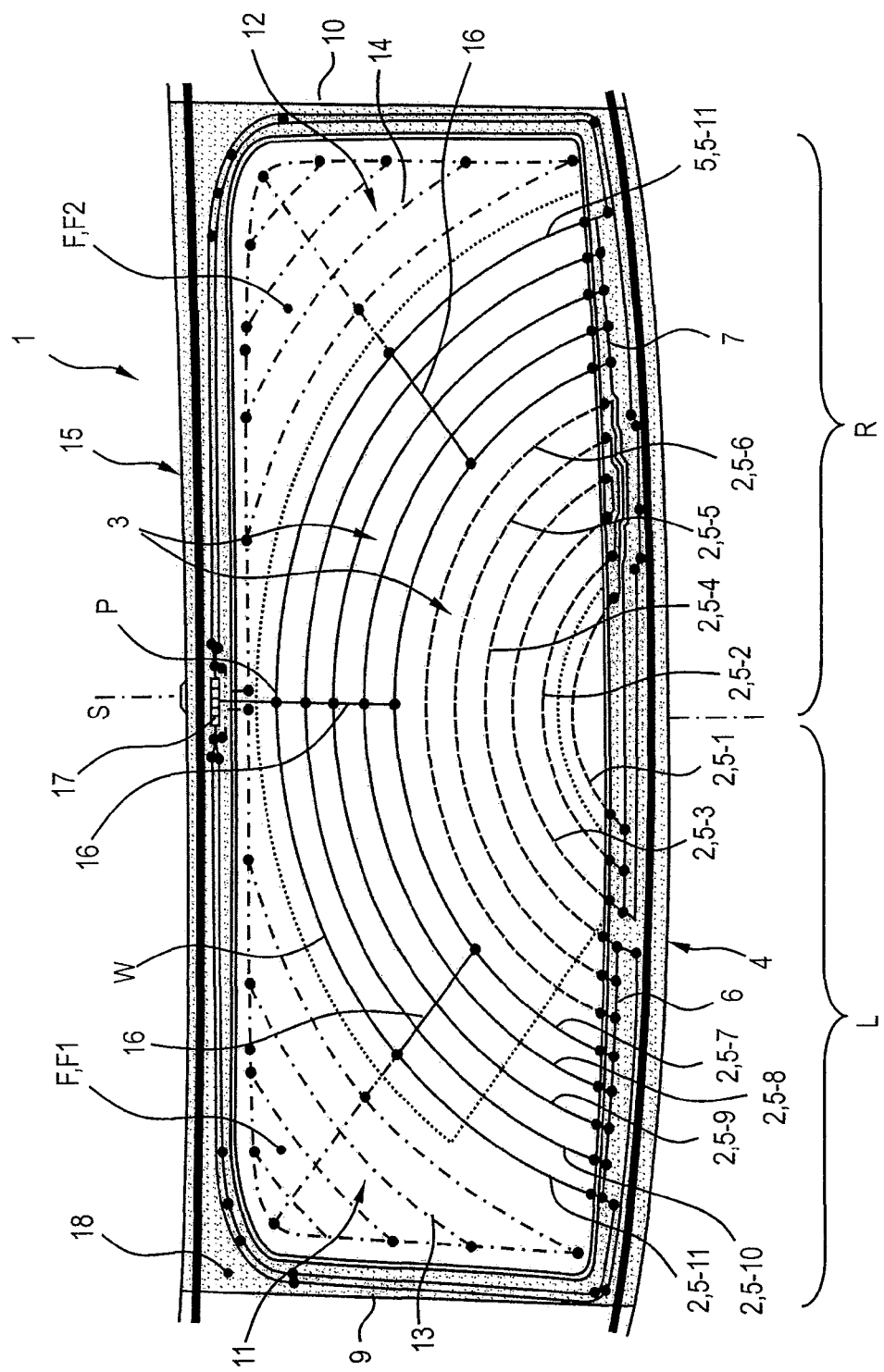
FIG. 1 is a top plan view of an interior of a rear pane according to the invention.
Figure 2:
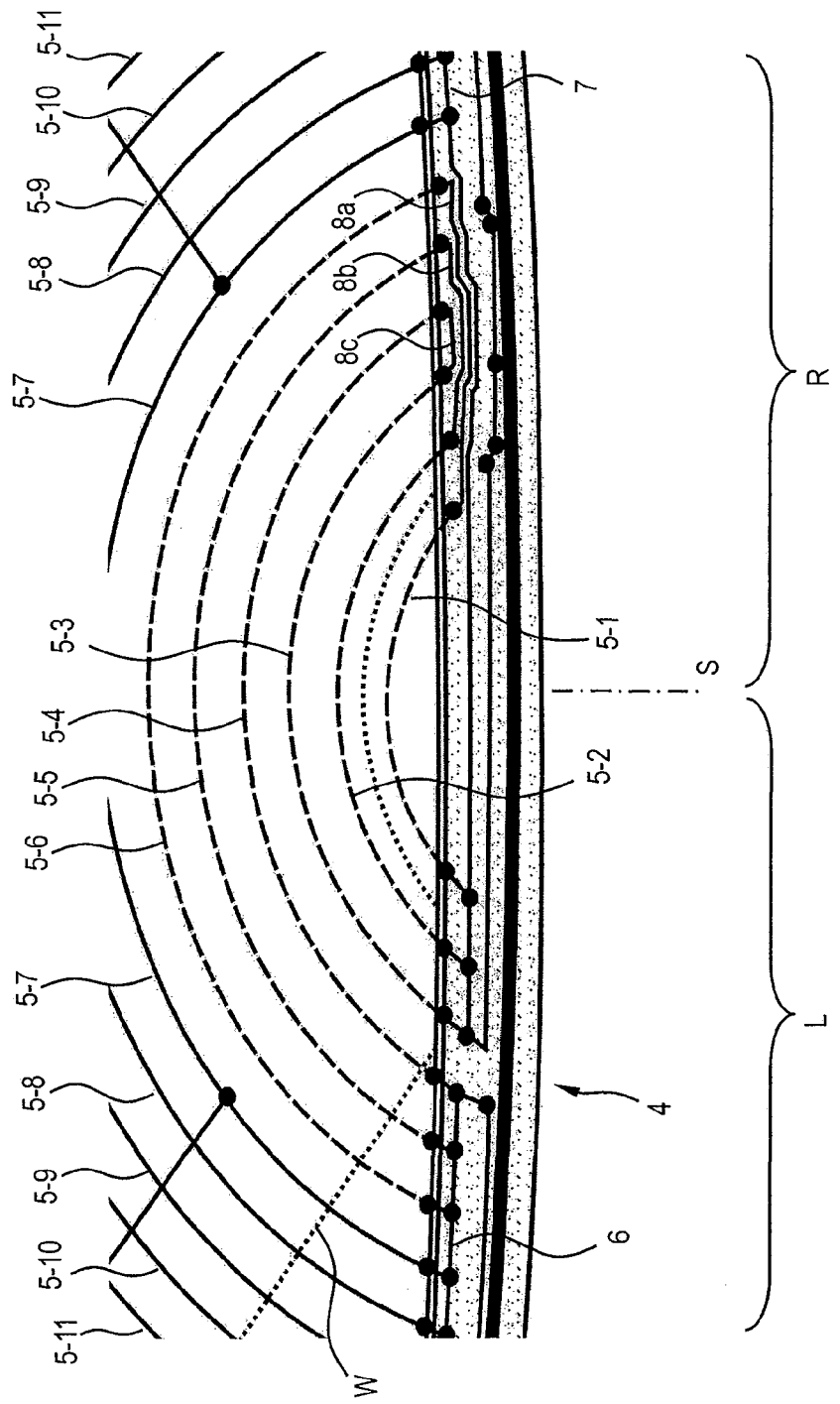
FIG. 2 shows a detail of a rear pane from FIG. 1 in the area of a bottom edge.
Figure 3:
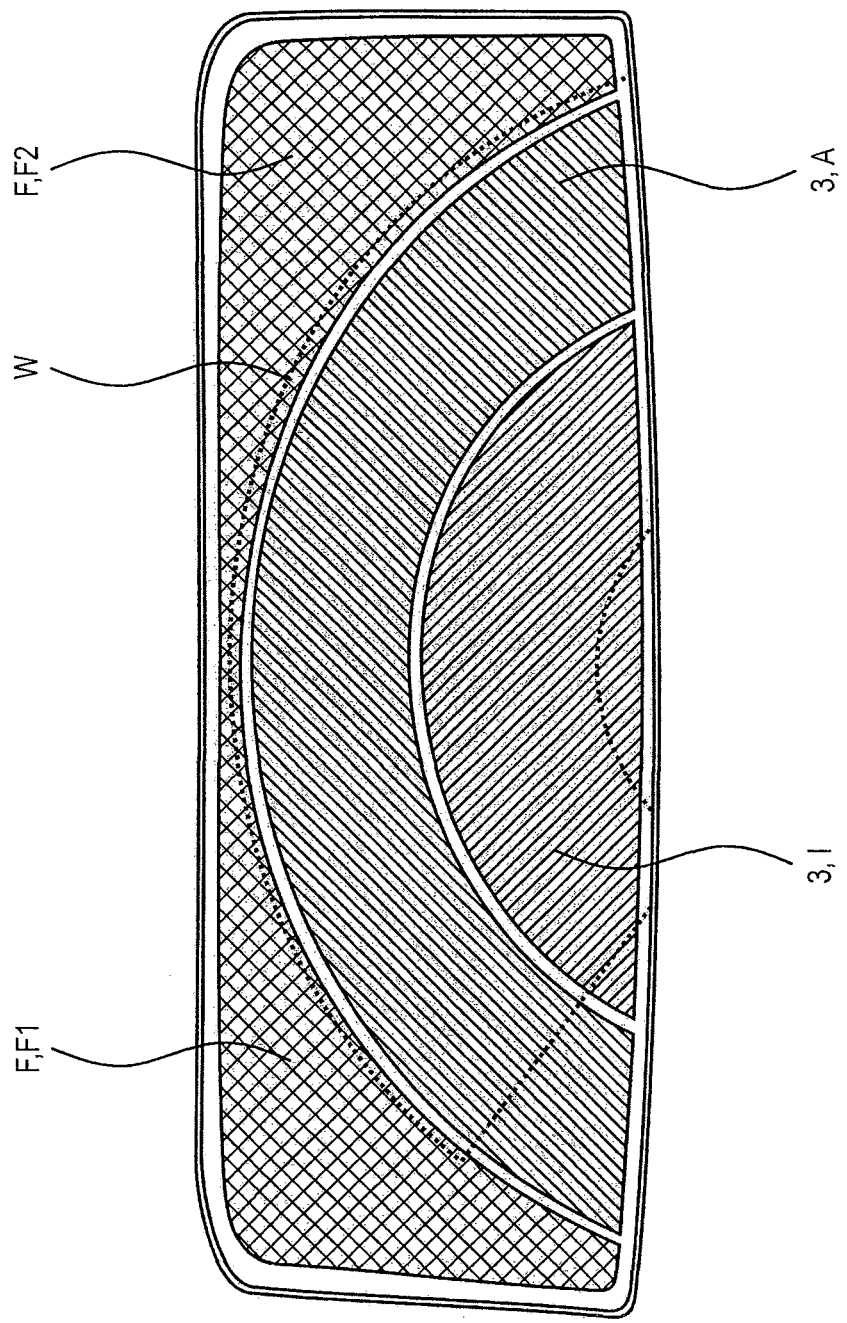
FIG. 3 shows an inventive rear pane that is subdivided according to function.

FIG. 1 is an overview, FIG. 2 shows a detail, and FIG. 3 shows the function of a rear pane 1 of a motor vehicle. The rear pane 1 is wiped in a wiping field W, which is shown as a dashed line, by means of a windshield wiper (not shown) that is mounted in a pivotable manner below the edge 4 of the pane. The rear pane 1 has a heating conductor field 3 that is formed by at least one heating conductor 2. In other words, the heating conductor field 3 is formed by the at least one heating conductor 2 and by the area defined thereby. The heating conductor field 3 has the basic shape of an angular sector, which extends in the shape of an annular sector from a left side L of the bottom side area and/or the edge 4 of the rear pane 1 over the rear pane 1 to a right side R of the bottom side area and/or edge 4, or vice versa. The left side L and the right side R of the rear pane 1 are defined in relation to a central, perpendicular mirror axis S. The heating conductor field 3 is designed in such a manner that it approximately covers the wiping area W so that an area of the rear pane 1 that can be effectively heated by the heating conductor field 3 and that is usually somewhat larger than the heating conductor field 3 can heat the entire wiping field W that is within the driver's field of vision. On the left side L the wiping field W does not extend as far as to the bottom edge 4 of the rear pane 1, so that what remains is a toroidal area of the heating conductor field 3 that is not wiped by a rear pane wiper, but is heated nevertheless.

In detail, the at least one heating conductor 2 has, inter alia, eleven arc shaped heating conductor sections 5 and/or 5-1 to 5-11, which are curved or arced upwards in the shape of a circle on the rear pane 1. The arc shaped heating conductor sections 5-1 to 5-11 are spaced equidistant apart from each other. In order to supply the at least one heating conductor 2, the bottom edge 4 has two bus bars 6 and 7 that lie approximately horizontally. The two bus bars 6, 7 are connected by the heating conductor 2. When the heating conductor field 3 is in operation, a heating current flows through one of the bus bars 6 or 7, continues through the at least one heating conductor 2 and then flows into the other bus bar 7 and/or 6. Consequently, at least the arc shaped heating conductor sections 5-1 to 5-11, which are configured as the heat resistance elements, are heated, as a result of which the rear pane 1 can be cleared of ice and moisture at least on the heating conductor field 3 and a little beyond.

For uniform heating of the heating conductor field it is generally desired that the heating conductor sections, which are arranged between the two bus bars, exhibit approximately the same resistance value. This situation is achieved in a simple way in the case of the rectangular heating area known from WO 2007/023054, where the individual heating conductors between the bus bars always have the same length. However, in the case of the present embodiment, the length of the arc shaped heating conductor sections 5-1 to 5-11 is always different. That is, the further outward they lie, the longer their length. Thus, the outermost arc shaped heating conductor section 5-11 exhibits the longest length, and the innermost arc shaped heating conductor section 5-1 exhibits the shortest length. In theory a different length of the heating conductor sections can be compensated by suitably varying the conductor width. However, in the present case the outermost arc shaped heating conductor section 5-11 is longer by a multiple than the innermost arc shaped heating conductor section 5-1. In order to produce in this case an approximately identical resistance value of the arc shaped heating conductor sections 5-1, 5-11, the outermost arc shaped heating conductor section 5-11 would have to be configured wider by a multiple than the innermost arc shaped heating conductor section 5-1. Correspondingly the conductor width of the other arc shaped heating conductor sections 5-2 to 5-10 would have to increase from the inside outwards. However, such an increase in the width of the heating conductor sections is perceived to be a very significant drawback from a design viewpoint and could even impede the vision in the area of the outer arc shaped heating conductor sections.

In particular, the inner arc shaped heating conductor sections 5-1 to 5-6, which form an inner heating conductor field I, show significant variations among each other with respect to the conductor path length, so that an adjustment of the resistance values of the arc shaped heating conductor sections 5-1 to 5-6 by an enlargement of the same is perceived to be disadvantageous from a design viewpoint. In contrast, to balance the resistance value it is preferred to choose the width of the outer arc shaped heating conductor sections 5-7 to 5-11 in such a manner that a variation in the conductor path width does not catch the eye of the viewer, so that a design neutrality can be reached without the need for any additional measures.

In order to avoid the size variation in the width of the inner arc shaped heating conductor sections 5-1 to 5-6 of the inner heating conductor field area I, the inner arc shaped heating conductor sections 5-1 to 5-6 are wired serially in pairs, and in particular, alternatingly from the outside inwards. This means that the innermost, shortest arc shaped heating conductor section 5-1 and the outermost, longest arc shaped heating conductor section 5-6 of the inner heating conductor field area I are galvanically or rather electrically connected together at one end by a connecting conductor path 8*a*. The second innermost arc shaped heating conductor section 5-2 is electrically connected together to the second outermost arc shaped heating conductor section 5-5 by a connecting conductor path 8*b*, and the adjacent arc shaped heating conductor sections 5-3 and 5-4 are electrically connected together at one end by a connecting conductor path 8*c*. As a result, the group of inner arc shaped heating conductor sections 5-1 to 5-6 experiences an increase in length between the bus bars 6 and 7. In this case the common or rather combined length of the serially connected inner arc shaped heating conductor sections 5-1, 5-6; 5-2, 5-5 and/or 5-3, 5-4 lies within a predefined range, which is much narrower than the variation in length of the individual arc shaped heating conductor sections 5-1 to 5-6. As a result of the decrease in the length difference, it is possible to limit any still necessary variation in width of the arc shaped heating conductor sections 5-1 to 5-6 to a scale, on which it is no longer or just barely perceived to be negative by a viewer, especially a driver. In addition, not only the length of the inner heating conductor field area I is adapted, but also the (now combined) length of the inner arc shaped heating conductor sections 5-1, 5-6; 5-2, 5-5 and/or 5-3, 5-4 is adjusted to approximately the length of the outer arc shaped heating conductor sections 5-7 to 5-11, which form an outer heating conductor field area A. Consequently a variation in width between the arc shaped heating conductor sections 5-1 to 5-6 of the inner heating conductor field area I and the arc shaped heating conductor sections 5-7 to 5-11 of the outer arc shaped heating conductor field area A can be reduced enough that any still necessary variation in the width of the arc shaped heating conductor sections 5-1 to 5-11 over the entire heating conductor field 3 is no longer conspicuous from a design viewpoint.

Owing to the alternating combination and/or meandering conductor path contouring of the arc shaped heating conductor sections 5-1 to 5-6, the bus bars 6, 7 are not symmetrical in relation to the mirror axis S, but rather the left bus bar 6 is connected to the eight ends of the eight outer arc shaped heating conductor sections 5-4 to 5-11, said ends being present on the left side L of the bottom edge 4, whereas the right bus bar 7 is connected to the ends of the five arc shaped heating conductor sections 5-7 to 5-11 that belong to the outer group of arc shaped heating conductor sections, said ends being present on the right side R of the bottom edge 4, as well as on the left side L to the ends of the three innermost arc shaped heating conductor sections 5-1 to 5-3 that are present there. Hence, in the outer heating conductor field area A the associated arc shaped heating conductor sections 5-5 to 5-11 are directly connected by means of the bus bars 6 and 7.

It is self evident that the present invention is not limited to the illustrated embodiment.

That area of the rear pane 1 that is not covered by the heating conductor field 3 forms an unheated open space F. Since in the illustrated embodiment an upper apex P of the heating conductor field 3 lies close to an upper edge 15 of the rear pane 1, the open space F is effectively divided into a left open space area F1 on the left side L of the rear pane 1 and a right open space area F2 on the right side R of the rear pane 1. Since the heating conductor field 3 conforms to the basic shape of the wiping field W and, thus, slopes downwards in the direction of a left side edge 9 and in the direction of a right side edge 10 of the rear pane 1, the result is an open space F and/or open space areas F1 and F2 that is (are) very much larger than a rectangular heating conductor field that runs from the left edge 9 to the right edge 10. As a result, it is possible to accommodate larger, more complex antennas on the open space F (that is, on or in the rear pane 1).

In the illustrated embodiment, each of the open space areas F1 and F2 has an antenna 11 and/or 12. These antennas 11, 12 exhibit antenna conductor paths 13 and/or 14 that are shown with a dashed-dotted line. The antenna conductor paths 13, 14 conform at least in sections approximately to the shape of the arc shaped heating conductor sections 5-1 to 5-11, and in particular between a respective side edge 9 and/or 10 and a left side L and/or a right side R of the upper edge 15 of the rear pane 1. Each of the two antennas 11 and 12 is designed as a log-periodic antenna, as a result of which the wideband operation is improved. As an alternative, the two antennas 11 and 12 can be connected together, in order to form portions of a common and/or single antenna.

According to one embodiment, one of the antennas 11, 12 is provided exclusively for operation in the AM range, whereas the other antenna 12 and/or 11 is provided for reception of FM, DAB, TV, etc. The antennas 11, 12 can be shaped so as to be identical and/or merely the mirror image or different. If the AM antenna 11 is housed in the large open space area F1, then this antenna can be geometrically optimized for AM reception in a simple way, as a result of which an antenna design with a high number of degrees of design flexibility is made possible. Thus, it is possible to dispense with a rod antenna or an expensive plastic roof spoiler with AM antenna function.

Moreover, the at least one heating conductor 2 can be used as an antenna and/or configured as such and attached ('heating conductor antenna'). Then the associated heating conductor field 3 can be introduced without influencing the equipotential surfaces of the at least one heating conductor 2 and/or the arc shaped heating conductor sections 5-1 to 5-11, for example, a perpendicular connection 16, for optimizing the antenna function. Other connections 16, which cross the arc shaped heating conductor sections 5-1 to 5-11 and are electrically connected to at least one of the crossing points, should be curved in conformity with the homogeneity requirements of the heating conductor field 3, a feature that can be calculated with the established mathematical methods. Since the heating conductor design exhibits by definition fewer degrees of flexibility in the design of the 'heating conductor antenna' due to the connections 16, concentrated blind elements (for example, electrical components like capacitors) can be mounted between the bus bars 6 and 7 and between the conductors of the connecting conductor paths 8a, 8b, 8c. This strategy improves the diversity efficiency, especially in the FM range, and improves in general the uncoupling between the directivity characteristics of the individual antennas. These circuit elements are also covered by the black print 18 of the pane.

As an alternative to the blind elements, a conductive material can be applied, for example, in the area of the bus bars 6, 7 and the connecting conductor paths 8a, 8b, 8c, as a result of which there is a dielectric material between the at least one heating conductor 2 and the conductive material. In this way the capacitive coupling of the bus bars 6, 7 and the connecting conductor paths 8a, 8b, 8c is implemented for the purpose of antenna optimization.

The base points of the antennas 11, 12 and/or 2 merge together in a central area on the upper edge 15 of the rear pane 1, where the corresponding antenna terminals 17 and, depending on the design requirements and the existing space, the antenna amplifiers or parts thereof are located. In the illustrated embodiment the upper apex of the heating conductor field 3 is located in the proximity of the upper edge 15, but the distance between them is so great that the antenna terminals 17 and optionally also the amplifiers or amplifier components can be housed in a common housing and/or unit (not shown).

From a manufacturing viewpoint such an approach facilitates a compact and simple design. If the wiping field W and with it the heating conductor field 3 are expanded more towards the upper edge 15, then the antenna terminals and optionally the amplifiers or the amplifier components can also be disposed on the upper edge 15 in a distributed manner, for example, with the terminals for the left antenna 11 on the left side L, with the antenna terminals for the right antenna 12 on the right side R and the antenna terminals for the at least one heating conductor 2 in the center, distributed on one of the two sides L, R or even on both sides L, R. In order to prevent a vehicle user from seeing the bus bars 6, 7, the connecting conductor paths 8a to 8c and the antenna terminals 17, are hidden behind an opaque black print area 18 that is a part of the rear pane 1 and that extends around the circumference of the edge and is shown herein as a flat area covered with dots.

If the long length of the windshield wiper demands that the heating conductor field 3 be expanded as far as up to the upper pane edge 15, then the antenna terminals—optionally with the related amplifier components—can be arranged in a decentralized manner, or the antenna terminals—optionally with the related amplifier components—can be distributed in the width in such a manner that the result is a single component with face-sided terminals of the antenna lines.

It is self evident that the present invention is not limited to the illustrated embodiment. Thus, more than two arc shaped heating conductor sections can also be electrically connected together in series. The arc shaped heating conductor sections can also be configured as polylines. Furthermore, the left side and the right side of the rear pane do not have to be designed so as to be symmetrical in relation to a central, perpendicular mirror axis. Hence, the antennas do not have to be shaped so as to be identical and/or merely mirror inverted.

The antennas may also look identical or mirror inverted, but may exhibit a different conductor structure. Thus, a certain section of a first antenna may be configured so as to be electrically conductive, whereas the corresponding section of a second antenna, optionally the mirror image thereof, represents only a visible strip without an electrical function.

Moreover, the antenna conductor paths do not have to conform at least in sections approximately to the shape of the arc shaped heating conductor sections.

Moreover, at least one of the antennas can be provided for operating in the AM range and for a reception of a different range or functions, for example, FM, DAB and/or TV, etc. It is possible to dispense with the opaque black print area for covering the bus bar(s), the connecting conductor path(s) and/or the antenna terminals.

| Table of Reference Numerals | |
|---|---|
| 1 | rear pane |
| 2 | heating conductor |
| 3 | heating conductor field |
| 4 | bottom edge |
| 5-1 to 5-11 | arc shaped heating conductor sections |
| 6 | bus bar |
| 7 | bus bar |
| 8a to 8c | connecting conductor path |
| 9 | left side edge |
| 10 | right side edge |
| 11 | left antenna |
| 12 | right antenna |
| 13 | antenna conductor path |
| 14 | antenna conductor path |
| 15 | upper edge |
| 16 | connection |
| 17 | antenna terminal |
| 18 | black print area |
| A | outer heating conductor field area |
| I | inner heating conductor field area |
| L | left side of the bottom side area |
| R | right side of the bottom side area |
| S | mirror axis |
| W | wiping field |
| F | open space |

| Table of Reference Numerals | |
|---|---|
| F1 | left open space area |
| F2 | right open space area |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle pane, comprising:
   a heating conductor field with at least one heating conductor and at least one antenna;
   wherein the at least one antenna is mounted on an area of the vehicle pane that is free with respect to the heating conductor field;
   wherein the heating conductor field has a basic shape of an essentially angular sector; and
   a group of several adjacent arc shaped heating conductor sections, wherein pairs of the arc shaped heating conductor sections are electrically connected together in series alternatingly from the outside inwards.

2. The vehicle pane according to claim 1, wherein the vehicle pane is a rear pane of the vehicle.

3. The vehicle pane according to claim 1, further comprising a second antenna, which is mounted on a different area of the free area of the vehicle pane.

4. The vehicle pane according to claim 1, further comprising:
   bus bars for supplying power to the at least one heating conductor, the bus bars being arranged on a common edge of the vehicle pane.

5. The vehicle pane according to claim 4, wherein the bus bars are arranged on a bottom edge of the vehicle pane.

6. The vehicle pane according to claim 4, wherein at least one section of the at least one heating conductor is designed as an arc shaped heating conductor section that runs between the bus bars.

7. The vehicle pane according to claim 5, wherein at least one section of the at least one heating conductor is designed as an arc shaped heating conductor section that runs between the bus bars.

8. The vehicle pane according to claim 6, wherein the at least one arc shaped heating conductor section is designed in a curved or polyline manner.

9. The vehicle pane according to claim 7, wherein the at least one arc shaped heating conductor section is designed in a curved or polyline manner.

10. The vehicle pane according to claim 1, wherein the at least one antenna is configured to operate at least in the AM range.

11. The vehicle pane according to claim 1, wherein at least two arc shaped heating conductor sections are electrically connected together in series.

12. The vehicle pane according to claim 11, wherein a common length of the arc shaped heating conductor sections that are connected together in series lies inside a predefined area.

13. The vehicle pane according to claim 1, wherein a common length of the arc shaped heating conductor sections that are connected together in series lies inside a predefined area.

14. The vehicle pane according to claim 1, wherein some of the arc shaped heating conductor sections are connected together in series and some of the arc shaped heating conductor sections are not connected together in series, a common length of both arc shaped heating conductor sections that are connected together in series and the arc shaped heating conductor sections that are not connected together in series lies inside a predefined area.

15. The vehicle pane according to claim 1, wherein, in addition, the at least one heating conductor is configured at least partially as an antenna.

16. The vehicle pane according to claim 1, further comprising:
   a plurality of antenna terminals, where all of the antenna terminals are housed in a common amplifier housing.

17. The vehicle pane according to claim 16, wherein the amplifier housing is mounted centrally on an upper edge of the vehicle pane.

18. The vehicle pane according to claim 1, wherein the at least one antenna is a log-periodic antenna.

19. A vehicle pane, comprising:
   a heating conductor field with at least one heating conductor and at least one antenna;
   wherein the at least one antenna is mounted on an area of the vehicle pane that is free with respect to the heating conductor field;
   wherein the heating conductor field has a basic shape of an essentially angular sector; and
   bus bars for supplying power to the at least one heating conductor, the bus bars being arranged on a common edge of the vehicle pane.

20. The vehicle pane of claim 19, wherein the common edge of the vehicle pane is one of a top edge of the vehicle pane and a bottom edge of the vehicle pane.

21. The vehicle pane of claim 19, further comprising:
   a group of several adjacent arc shaped heating conductor sections, wherein pairs of the arc shaped heating conductor sections are electrically connected together in series alternatingly from the outside inwards.

* * * * *